United States Patent
Tavares

(10) Patent No.: US 7,020,207 B1
(45) Date of Patent: Mar. 28, 2006

(54) VIDEO ERROR CONCEALMENT MECHANISM FOR BLOCK BASED VIDEO DECOMPRESSION

(75) Inventor: Clifford Tavares, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 499 days.

(21) Appl. No.: 10/308,287

(22) Filed: Dec. 2, 2002

(51) Int. Cl.
*H04N 7/12* (2006.01)

(52) U.S. Cl. ............................................. 375/240.27
(58) Field of Classification Search .......... 375/240.27, 375/240.16, 240.24; 348/402.1, 416.1, 414.1, 348/413.1, 418.1; H04N 7/12
See application file for complete search history.

(56) References Cited

U.S. PATENT DOCUMENTS

| | | | |
|---|---|---|---|
| 5,122,875 A * | 6/1992 | Raychaudhuri et al. | 348/390.1 |
| 5,400,076 A | 3/1995 | Iwamura | |
| 5,442,400 A | 8/1995 | Sun et al. | |
| 5,455,629 A * | 10/1995 | Sun et al. | 375/240.27 |
| 5,552,831 A | 9/1996 | Machida et al. | |
| 5,614,958 A * | 3/1997 | Shikakura | 348/616 |
| 5,778,191 A * | 7/1998 | Levine et al. | 709/247 |
| 5,910,827 A | 6/1999 | Kwan et al. | |
| 6,111,916 A * | 8/2000 | Talluri et al. | 375/240.23 |
| 6,404,817 B1 | 6/2002 | Saha et al. | |
| 6,498,809 B1 * | 12/2002 | Dean et al. | 375/240 |

* cited by examiner

*Primary Examiner*—Nhon Diep
(74) *Attorney, Agent, or Firm*—Townsend and Townsend and Crew LLP

(57) ABSTRACT

Embodiments of the present invention provide methods and apparatus for decoding digital video or motion picture signals with error concealment to prevent or minimize degradation of the picture quality. When corruption occurs, the method determines whether error concealment is needed according to a preset criterion. If so, motion vectors for the corrupt region are calculated using the motion vectors and rates of change of motion of current blocks in the current frame and/or old blocks in a previous frame according to a best matching block selection process. The method also determines if the "time" relative motion of content is small by defining a percentage use parameter. In some cases, once the error concealment is complete, the "weight" or visual sensitivity of the restored block is decreased in order to reduce boundary artifact effects. This is accomplished by a quantization mask employing the human visual system (HVS) concept.

29 Claims, 5 Drawing Sheets

VIDEO ERROR CONCEALMENT MECHANISM FOR BLOCK BASED VIDEO DECOMPRESSION

CROSS-REFERENCES TO RELATED APPLICATIONS

Not Applicable

BACKGROUND OF THE INVENTION

The present invention relates generally to methods and apparatus for decoding digital video or motion picture signals and, more particularly, to video error concealment for block-based video decompression.

Video decompression of compressed signals is applicable in static recording media such as optical discs (e.g., DVD and VCD), in broadcast (e.g., via network), in streaming media (e.g., WMV and real video), and the like. Examples of video compression include MPEG (Moving Picture Experts Group) 2 and MPEG 4. In the MPEG systems, differences between pictures of the motion picture signal are determined to reduce redundancy in the time domain. These differences are subject to a discrete cosine transform (DCT) to reduce the redundancy in the spatial domain. Generally, a digital video signal coding apparatus first performs motion compensation for each of the pixel blocks (e.g., N×N pixels) which constitute the previous frame in order to remove correlation in time, and calculates a difference value of each pixel block between the previous frame and the current frame. The amount of information relating to the difference values is much smaller than the amount of information relating to the current frame. The difference values and motion vectors used for the motion compensation are coded, and binary codes are outputted. A digital video signal decoding apparatus decodes the binary codes outputted from the coding apparatus to obtain a difference value of each pixel block between the motion-compensated previous frame and the current frame, and a motion vector used for the motion compensation for that pixel block. The decoding apparatus has a frame memory for storing the previous frame. Pixel blocks that constitute the previous frame stored in the frame memory are motion-compensated by using corresponding motion vectors. The difference values are added to the motion compensation pixel blocks in the previous frame to reproduce the current frame. The reproduced current frame is then stored in the frame memory. In this way, the decoding apparatus allows the current frame to be reproduced only by the use of the difference values of the respective pixel blocks between the previous frame and the current frame, and the motion vectors.

If the compressed motion picture signal includes an error which cannot be corrected by the error correcting ability of the decoder, the resulting motion picture output signal lacks a portion corresponding to the erroneous part of the compressed signal. An error concealment mechanism is needed to ensure that the missing signal portion does not noticeably impair the quality of the picture displayed in response to the motion picture output signal.

BRIEF SUMMARY OF THE INVENTION

Embodiments of the present invention provide methods and apparatus for decoding digital video or motion picture signals with error concealment to prevent or minimize degradation of the picture quality. Motion video is characterized by temporal correlation. The present invention exploits such a correlation by reconstructing the nature of motion in frames and using the information from the reconstruction to estimate the location of a block as a result of motion. A shadow buffer is maintained that contains information used to predict a motion vector in case of a signal corruption. In specific embodiments, the information contained in the shadow buffer includes previously decoded motion vectors and the rate of change of motion. The rate of change of motion is determined for a given block by evaluating the difference between its motion vectors (MVs) in two successive frames: dx, dy=MV(x, y)$_{t1}$−MV(x, y)$_{t0}$, where t0 and t1 represent time for two successive frames. When corruption occurs, the method determines whether error concealment is needed according to a preset criterion. If so, motion vectors for the corrupt region are calculated using the information stored in the shadow buffer. Once the error concealment is complete, the "weight" or visual sensitivity of the restored block is decreased in order to reduce artifact effects such as those due to mismatch of "edges" at block boundaries. This is accomplished by a quantization mask employing the human visual system (HVS) concept.

An aspect of the present invention is directed to a method of correcting errors in a compressed motion picture signal having a plurality of frame pixel blocks in a current frame which include corrupt blocks and non-corrupt blocks. The method comprises decoding non-corrupt blocks of the compressed motion picture signal, and determining a % corruption of the current frame by counting a number of corrupt blocks and dividing the number of the corrupt blocks by a total number of blocks in the current frame. For each main block in the current frame which is corrupt and an old main block in a previous frame immediately preceding the current frame and corresponding to the main block in the current frame, a percentage use is determined representing a percentage of content in the old main block which has moved outside the main block in the current frame. If the % corruption is smaller than a minimum corrupt threshold and if the percentage use is smaller than a minimum use threshold, then a zero motion vector is assigned to the main block in the current frame.

In some embodiments, if the % corruption is greater than a maximum allowable corrupt threshold, then the method avoids determining and assigning new motion vectors for the corrupt blocks in the current frame. The method may comprise determining a motion vector and a rate of change of motion of each non-corrupt block in the current frame, and updating a shadow buffer with the motion vector and rate of change of motion for each non-corrupt block. For each main block in the current frame which is corrupt and an old main block in a previous frame immediately preceding the current frame and corresponding to the main block in the current frame, the method may comprise determining a motion vector and a rate of change of motion of the main block in the current frame, and updating the shadow buffer with the motion vector and rate of change of motion for the main block.

Another aspect of the invention is directed to a method of determining a motion vector for a main block of digital signal data having a plurality of frame pixel blocks in a current frame, wherein data relating to the main block are corrupt. If one or more of four adjacent blocks which are adjacent to the main block in the north, south, east, and west directions are non-corrupt in the current frame, and if an old main block in a previous frame immediately preceding the current frame and corresponding to the main block in the current frame is non-corrupt, then the method reconstructs current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, averages motion vectors of the one or more non-corrupt adjacent blocks in the current frame and the reconstructed current motion vector of the non-corrupt old main block, and assigns the averaged motion vector to the main block in the current frame.

In some embodiments, if one or more of the four adjacent blocks are non-corrupt in the current frame, and if the old main block in the previous frame corresponding to the main block in the current frame is corrupt, then the method averages motion vectors of the one or more non-corrupt adjacent blocks in the current frame, and assigns the averaged motion vector to the main block in the current frame. If the four adjacent blocks are corrupt in the current frame and if one or more of four auxiliary blocks which are next to the main block in the northeast, northwest, southeast, and southwest directions are non-corrupt in the current frame, then the method averages motion vectors of the one or more non-corrupt auxiliary blocks and assigning the averaged motion vector to the main block in the current frame. If the four adjacent blocks and four auxiliary blocks are corrupt in the current frame and if the old main block in the previous frame is non-corrupt, then the method reconstructs current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, and assigns the motion vector of the old main block to the main block in the current frame. If the four adjacent blocks and four auxiliary blocks are corrupt in the current frame and if the old main block in the previous frame is corrupt, and if one or more of four old adjacent blocks in the previous frame corresponding to the four adjacent blocks in the current frame are non-corrupt, then the method selecting the one or more non-corrupt old adjacent blocks which are non-corrupt, reconstructs current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$, and averages the current motion vectors ($MV_{current}$) for the selected blocks and assigns the averaged motion vector to the main block in the current frame. If the four adjacent blocks and four auxiliary blocks are corrupt in the current frame and if the old main block in the previous frame is corrupt, and if the four old adjacent blocks in the previous frame are corrupt, then the method selects the old main block and the four old adjacent blocks, reconstructs current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$, and averages the current motion vectors ($MV_{current}$) for the selected blocks and assigns the averaged motion vector to the main block in the current frame.

Another aspect of the invention is directed to a method of correcting errors in a compressed motion picture signal having a plurality of frame pixel blocks in a current frame which include corrupt blocks and non-corrupt blocks. The method comprises decoding non-corrupt blocks of the compressed motion picture signal in the current frame; decoding corrupt blocks of the compressed motion picture signal using information of the non-corrupt blocks in the current frame and information of old blocks in a previous frame immediately preceding the current frame; reconstructing the motion picture based on the motion vector and the rate of change of motion of the blocks in the present frame; and post-processing the reconstructed motion picture by a weighted inverse human visual system.

In some embodiments, post-processing comprises providing a relationship of human visual response represented as a weighting versus frequency components based on the human visual system; specifying a weighting factor δ and a minimum threshold level of stimulation C; calculating a weighted inverse human visual system parameter according to $1/(H(w))+C$; and applying the weighted inverse human visual system parameter to the corrupt blocks of the reconstructed motion picture.

Another aspect of the invention is directed to a system for correcting errors in a compressed motion picture signal having a plurality of frame pixel blocks in a current frame which include corrupt blocks and non-corrupt blocks. The system comprises a decoding unit configured to decode non-corrupt blocks of the compressed motion picture signal, and an error concealment unit configured to determine, for each main block in the current frame which is corrupt and an old main block in a previous frame immediately preceding the current frame and corresponding to the main block in the current frame, a motion vector of the main block in the current frame. Determining the motion vector of the main block includes decoding non-corrupt blocks of the compressed motion picture signal; determining a % corruption of the current frame by counting a number of corrupt blocks and dividing the number of the corrupt blocks by a total number of blocks in the current frame; for each main block in the current frame which is corrupt and an old main block in a previous frame immediately preceding the current frame and corresponding to the main block in the current frame, determining a percentage use representing a percentage of content in the old main block which has moved outside the main block in the current frame; and if the % corruption is smaller than a minimum corrupt threshold and if the percentage use is smaller than a minimum use threshold, then assigning zero motion vector to the main block in the current frame.

In some embodiments, a shadow buffer is configured to store decoded motion vectors of the blocks of the compressed motion picture signal. A shadow buffer access unit is configured to access the shadow buffer to retrieve data and update data in the shadow buffer. A motion compensation unit is configured to reconstruct the motion picture based on the motion vectors of the blocks in the present frame. A post-processing unit is configured to post-process the reconstructed motion picture by a weighted inverse human visual system.

DETAILED DESCRIPTION OF THE INVENTION

Figure 1:
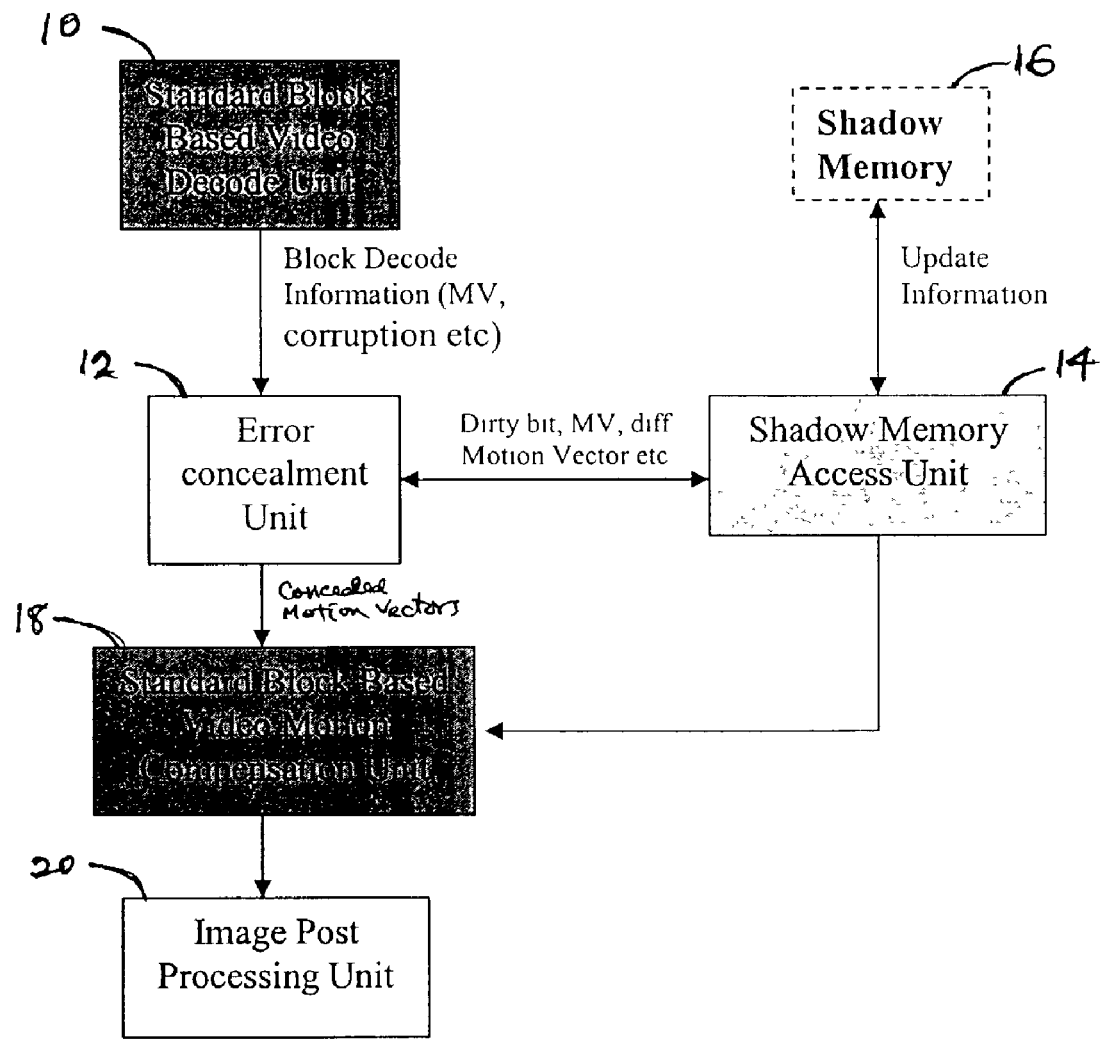
FIG. 1 is a simplified block diagram of a system for decoding video signals according to an embodiment of the present invention.

The present invention exploits the temporal correlation of motion video by reconstructing the nature of motion in frames and using the information from the reconstruction to estimate the location of a block as a result of motion. FIG. 1 shows a simplified block diagram of the system for decoding video signals using an error concealment scheme to prevent or minimize degradation of the picture quality due to corrupt blocks. The system includes a block-based video decoding unit 10 which may be a standard unit used to block-decode video signals. An error concealment unit or module 12 is provided to perform error concealment of corrupt blocks. A shadow memory access unit 14 allows access to a shadow memory or buffer 16 which stores information that can be used to predict a motion vector in case of a signal corruption. A standard block-based video motion compensation unit 18 is used to reconstruct image in the corrupt blocks. An image post-processing unit 20 performs post-processing of the image to improve picture quality and reduce artifact effects.

Figure 2:
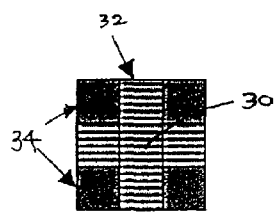
FIG. 2 shows a center block surrounded by adjacent blocks and auxiliary blocks.

FIG. 2 shows a main block 30 in the center to be decoded. The main block 30 is surrounded by four "adjacent" blocks 32 in the north, south, east, and west directions, and by four "auxiliary" blocks 34 in the northeast, northwest, southeast, and southwest directions.

Figure 3:
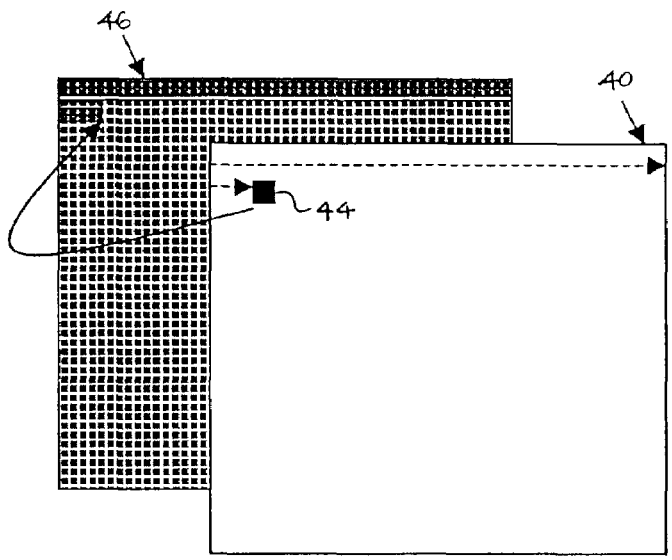
FIG. 3 shows a frame being decoded and a shadow buffer.

The block-based video decompression is illustrated in FIG. 3 for the frame 40 including the direction of decoding 42 and the current block being decoded 44. This block decoding is performed by the decoding unit 10 of FIG. 1. A shadow buffer 46 (which is the shadow memory 16 of FIG. 1) is maintained that contains information used to predict a motion vector in case of a signal corruption. The shadow buffer contains information used for reconstruction of corrupt blocks. The number of entries in the shadow buffer equals the number of blocks in the frame. In specific embodiments, the information contained in the shadow buffer 46 includes previously decoded motion vectors and the rate of change of motion dx, dy (i.e., the difference between the previous motion vector and the current motion vector). Additional information may include percentage use which is defined below, and dirty flag which indicates whether a block is dirty (corrupt) or not. Thus, a shadow buffer can be defined as:

struct ShadowB {motion vector, percentage use, dirty flag, dx, dy }.

Figure 4:
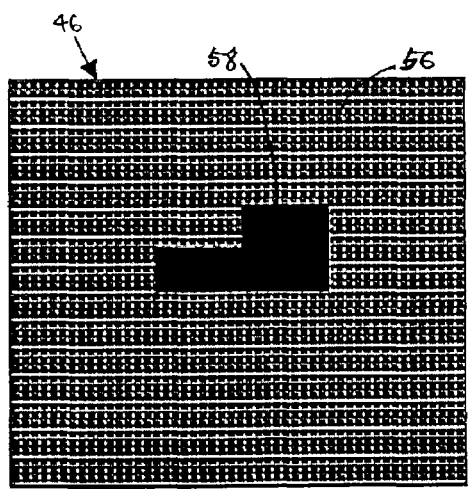
FIG. 4 shows the current decoded frame and the shadow buffer having corrupt data.
Figure 4:
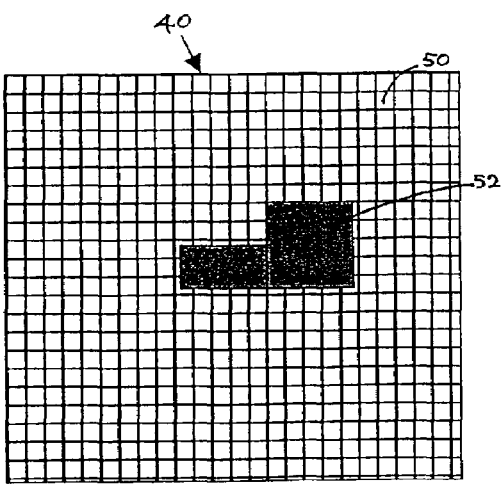

FIG. 4 shows the current decoded frame 40 and the shadow buffer 46 in the event where corrupt data is present. The frame 40 includes blocks of correctly decoded visual data 50 and corrupt or missing visual data 52. As the frame 40 is decoded, the information in the shadow buffer 46 is updated based on the correctly decoded visual data 50 in the current frame 40. FIG. 4 shows the freshly updated shadow buffer elements 56 corresponding to the correctly decoded visual data 50, as well as the missing shadow buffer elements 58 which cannot be updated by using the corrupt visual data 52. Instead, the missing shadow buffer elements will be updated using previous, correct updates as described in more detail below.

Figure 5A:
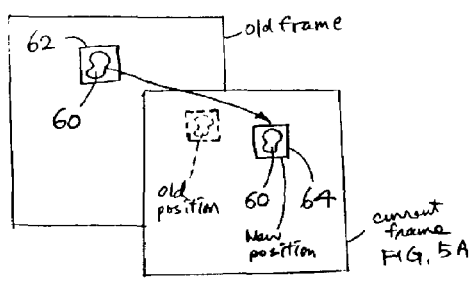
FIGS. 5A and 5B show movement of the content in a block to illustrate the percentage use parameter.
Figure 5B:

When corruption occurs, the method determines whether error concealment is needed according to a preset criterion. This determination may be made in the error concealment unit 12 or a separate determination unit. The criterion employs a "% corruption" parameter and a "percentage use" parameter for decision making. The % corruption is obtained by statistical analysis of the frame to determine the percentage of corruption of the image in the current frame, for example, by counting the number of corrupt blocks and dividing it by the total number of blocks in the frame. The percentage use (or % reference) parameter is illustrated in FIGS. 5A and 5B. Between adjacent frames, the content typically remains substantially the same although there will likely be movement of the content. When the content 60 in a block 62 of the previous frame immediately preceding the current frame has completely moved outside the corresponding block in the current frame to another block 64, as shown in FIG. 5A, the percentage use is 100%. In FIG. 5B, the percentage use is 75% since 25% of the content 66 in a block 68 of the previous frame remains in the corresponding block in the current frame while 75% of the content 66 has moved to adjacent and auxiliary blocks.

If the % corrupt of the image of the current frame is greater than a maximum allowable corrupt threshold (threshold 1), the image is too corrupt to be corrected by error concealment. In that case, no error concealment is performed since there is large content loss. If the % corrupt is less than a minimum corrupt threshold (threshold 3) and if the percentage use of the current frame is less than a minimum use threshold (threshold 2), the image is only slightly corrupt and has not moved significantly from the previous frame. In that case, no error concealment is necessary. If the percentage use is less than the minimum use threshold, then the motion vectors for the corrupt blocks are reset to zero in the shadow memory 16. The motion vectors for the corrupt blocks can be set to zero. The maximum allowable corrupt threshold and minimum corrupt threshold are specified by the user, and depends on a number of factors relating to the nature of content, such as the quality requirement, frame rate, image size, and the like, of the picture. The minimum use threshold is specified by the user, and is selected based on the quality requirement of the product. The higher the quality requirement, the lower is the minimum use threshold.

If error concealment is needed, the error concealment unit 12 calculates the motion vectors for the corrupt region using the information stored in the shadow buffer 16. The error concealment unit 12 employs a best matching block selection process to determine what information in the shadow buffer to use to obtain the motion vectors for the corrupt blocks in the current frame. For a given corrupt block (current main block) to be corrected, the error concealment unit 12 initially looks for any non-corrupt adjacent blocks and determines whether the block to be corrected in the previous frame (old main block) was corrupt. If one or more non-corrupt adjacent blocks exist, the error concealment unit 12 selects such blocks as well as the non-corrupt old main block in the previous frame if such a block also exists. If there are no non-corrupt adjacent blocks and no non-corrupt old main block, the error concealment unit 12 looks for any non-corrupt auxiliary blocks and selects such block(s) if one or more of them exist. If the adjacent and auxiliary blocks are corrupt but the old main block is not corrupt, then the error concealment unit 12 selects the non-corrupt old main block. If the adjacent and auxiliary blocks as well as the old main block are all corrupt, then the error concealment unit 12 looks for any non-corrupt adjacent blocks in the previous frame (old adjacent blocks). If no such non-corrupt old adjacent blocks exists, then the error concealment unit 12 selects the old main block and old adjacent blocks. Such old blocks were corrupt, and might have been corrected by the error concealment scheme or might not have been corrected if the errors were sufficiently small that they did not meet the threshold for invoking the error concealment scheme.

For the selected block or blocks that are non-corrupt, the error concealment unit 12 takes an average of the motion vector(s) and assigns that average to be the current motion vector of the current main block and calculates the rate of change of motion based on the current motion vector and the previous motion vector for the main block. For the selected block or blocks that are corrupt, the error concealment unit 12 first reconstructs current motion vectors ($MV_{current}$) by updating the previous motion vectors ($MV_{old}$) using the previous rate of change of motion $(dx, dy)_{old}$, i.e., $MV_{current}=MV_{old}+(dx, dy)_{old}$. This is referred to the equation A. The error concealment unit 12 then takes an average of the $MV_{current}$ of the selected block(s) and assigns that average to be the current motion vector of the current main block and calculates the rate of change of motion based on the current motion vector and the previous motion vector for the main block. The best matching block selection process requires only simple and minimal calculations, and typically represents less than about 2% of the total computation time of the overall decoding procedure.

Once the error concealment is complete, the image post processing 20 unit post-processes the image. In specific embodiments, the post-processing includes using a de-blocking filter to adjust the background intensity, illumination and brightness, and employs a quantization mask based on the human visual system (HVS) concept for the corrupt blocks to decrease the "weight" or visual sensitivity or strength of the restored block to reduce artifact effects. The use of discrete cosine transform (DCT) for decoding is known in the art. In strength reduction, the DCT coefficients of a pixel block is multiplied by the weighting factors to achieve a strength or visual sensitivity reduction. For each block, $BLKH(w)=H'(w){\times}BLK(w),$ $BLK(x, y)=IDCT(BLKH(w)),$ where
w=frequency components (DCT coefficients),
(x, y)=spatial components,
H'(w)=the HVS response.

HVS represents the response of the human eye to an impulse of light, and defines the response of the human eye to different image components. For a discussion of the use of HVS, see N. J. Jayant, J. Johnston and R. Safranek, "Signal Compression Based on Models of Human Perception," Proc. of the IEEE, vol. 81, pp. 1385–1422, 1993, which is incorporated herein by reference in its entirety. The use of HVS in transform image coding is described in the paper in the appendix. The references cited in the appendix are incorporated herein by reference.

Figure 6:
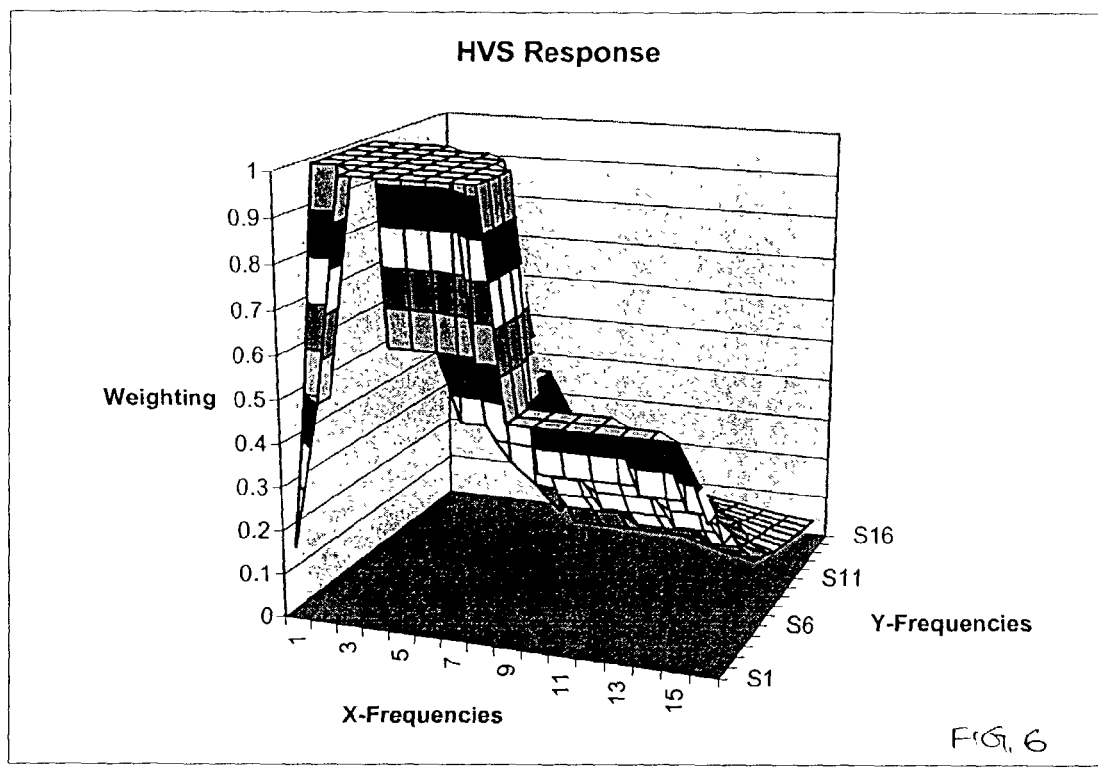
FIG. 6 shows a plot of the human visual response represented as a weighting versus frequency components based on the human visual system (HVS) concept.
Figure 7:
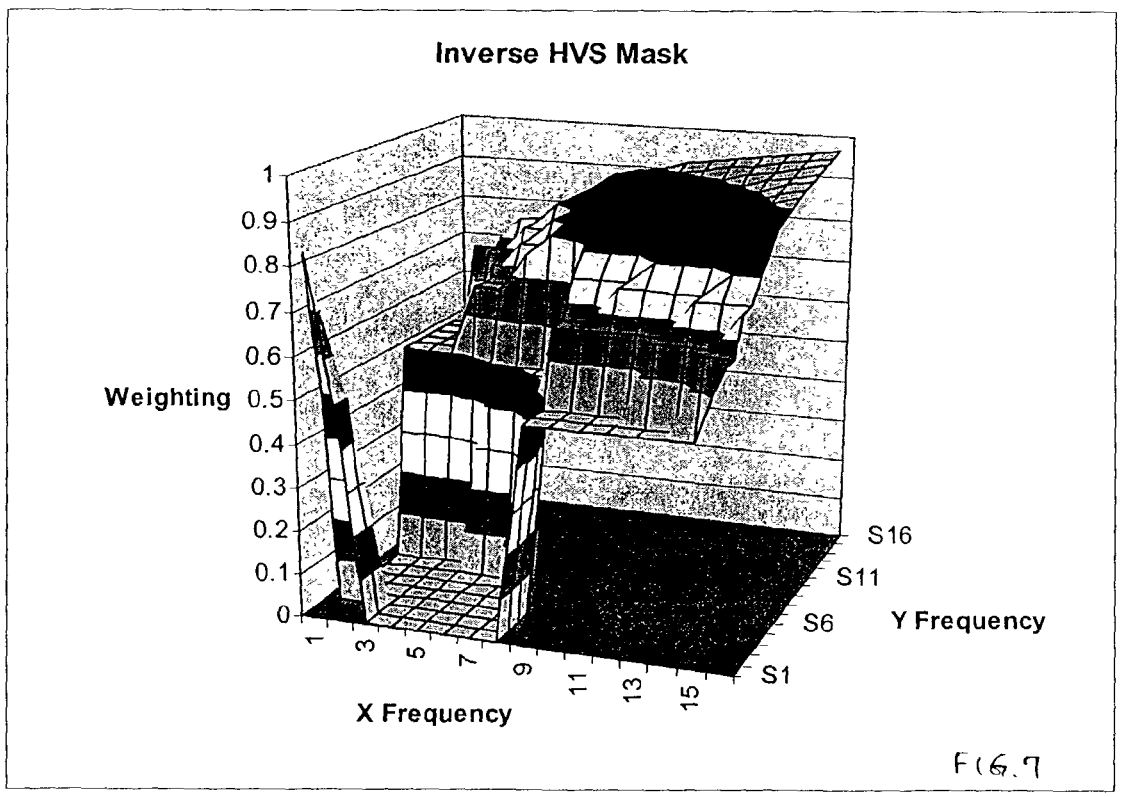
FIG. 7 shows a plot of the inverse stimulation H.
Figure 8:
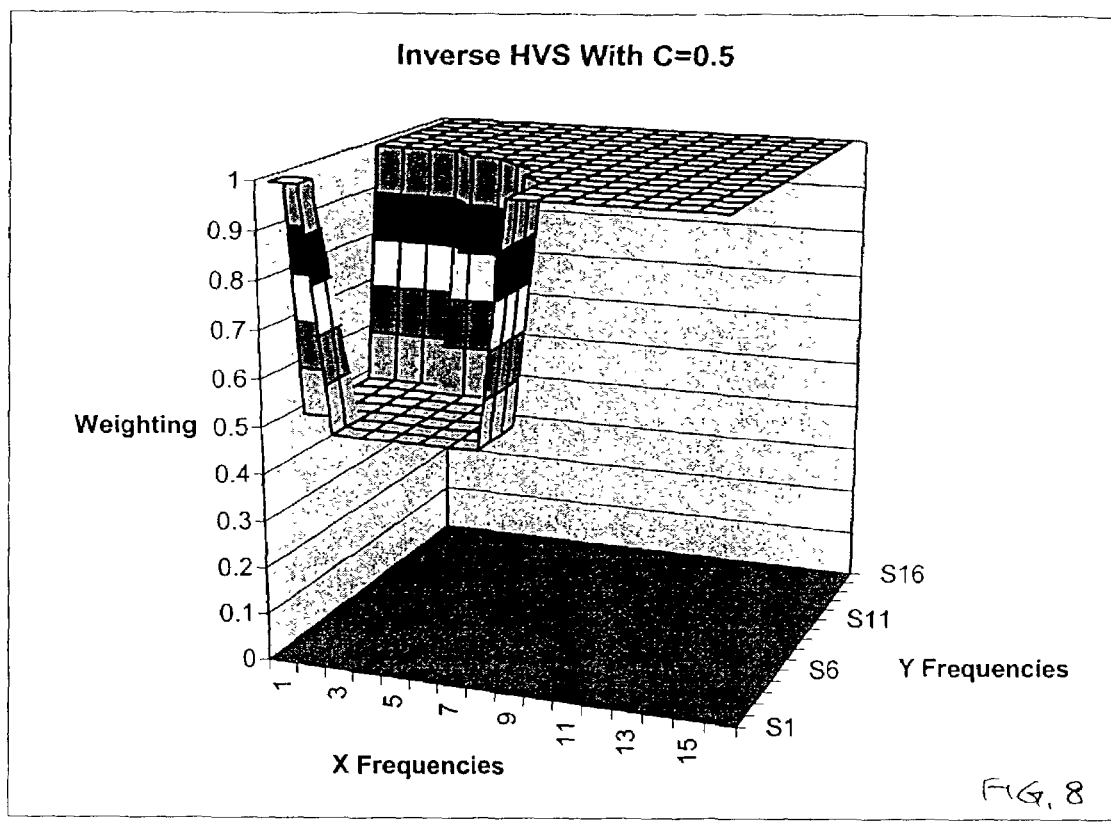
FIG. 8 shows a plot of the inverse stimulation H offset by a constant C which defines the minimum threshold level of stimulation.

FIG. 6 shows a plot of the human visual response represented as a weighting versus x and y frequency components, the relationship being the HVS in one example. To reduce the effect of high sensitivity in the image, the image post-processing unit 20 applies a weighted inverse-HVS to the restored block(s). FIG. 7 shows a plot of the inverse stimulation H. FIG. 8 shows a plot of the inverse stimulation H offset by a constant C which defines the minimum threshold level of stimulation (threshold 4): 1/H+C. The constant C are specified by the user, and are selected based on the nature of content of the image and the quality requirement of the product. For example, a lower threshold constant C is used for higher definition requirement.

Figure 9:
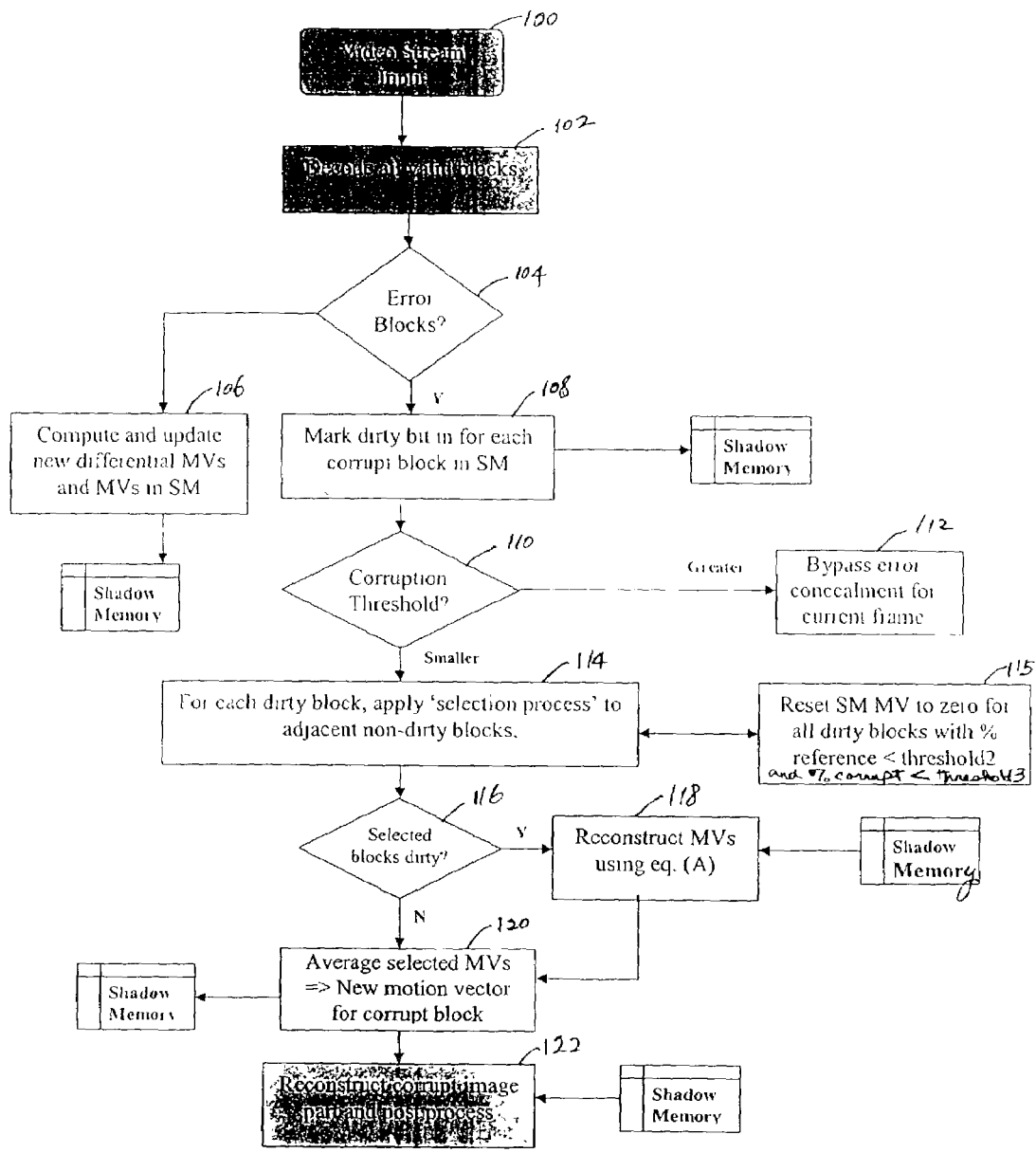
FIG. 9 is a simplified flow diagram illustrating the method of the present invention according to an embodiment of the invention.

FIG. 9 summarizes the methodology according to an exemplary embodiment of the present invention. The block-based video decoding unit 10 receives video stream input (step 100) and decodes all valid blocks (step 102). The error concealment unit 12 determines if there are any error blocks or corrupt blocks (step 104). If there are no error blocks, the shadow memory access unit 14 computes and updates new differential motion vectors (i.e., rate of change of motion) and motion vectors (MVs) in the shadow memory 16 (step 106). Post processing by the image post-processing unit 20 may optionally be performed.

If error blocks exist, each error block is marked as a "dirty" bit in the shadow memory 16 (step 108). A determination is made as to whether error concealment is to be performed based on the threshold parameters described above (step 110). If the error is too large to be corrected by error concealment based on the user-specified maximum allowable corrupt threshold, the system bypasses error concealment for the current frame (step 112). Otherwise, the error concealment unit 12 applies the best matching block selection process to select blocks for error concealment of the current main block (step 114). If the percentage use (or % reference) is less than the minimum use threshold (threshold 2) and if the % corrupt is less than a minimum corrupt threshold (threshold 3), then the motion vectors for the dirty blocks are reset to zero in the shadow memory 16 (step 115).

The error concealment unit 12 determines whether the selected blocks are dirty or corrupt (step 116). If they are dirty or corrupt, the motion vectors (MVs) are reconstructed using equation A based on information of the previous or old frame stored in the shadow memory 16 (step 118). This may be performed by the shadow memory access unit 14. If the blocks are not dirty, there is no need to reconstruct the motion vectors. In step 120, the selected motion vectors are averaged to obtain the new motion vector for the corrupt block. The shadow memory 16 is updated. This may be performed by the shadow memory access unit 14. In step 122, the block-based video motion compensation unit 18 is used to reconstruct image in the corrupt blocks, and the image post-processing unit 20 performs post-processing of the image to reduce artifact effects.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

APPENDIX

Use of Adaptive-Fuzzy Control and Human Visual System in Transform Image Coding

Abstract: The Chen's image classification technique [4] when used along with a fuzzy system gives an efficient image block classification and adaptive coding technique. The modified Chen's system suggested in this paper is used to obtain the training sets for the definition of the fuzzy system. Such a system dispenses with the computational burden associated with the traditional Chen's system and is at the same time adaptable to various grayscale images.

The fuzzy system is used to decide the nature of the mask used on a block so as to obtain the maximum compression. This decision depends on the factors Perceptual Error, Power Distribution and Background Intensity. Various quantization masks (Q-Masks) and related image quality factors have been defined in this context. The fuzzy system encodes commonsense linguistic rules in the form of a FAM (Fuzzy Associative Matrix).

The HVS (Human Visual System) is used to remove any perceptual redundancies in the image. the HVS model is incorporated for quality assessment based on the human perspective. It is found that the use of HVS masking and assessment results in a substantial improvement in the subjective image quality.

A Fixed prune is used in the case of the 16×16 image sub-blocks to remove redundancies in the form high frequency coefficients that are of negligible size or do not contribute to the perceptual value of the image. A system for the dynamic 16-point pruning is used to remove further redundancies in image sub-blocks.

RLE (Run-Length Encoding) and Huffman encoding is used remove the statistical redundancies. The processed image performs well both in compression ratio as well as the observed quality. Perceptual error has been used as a standard for the evaluation of the image in this paper.

The Cosine Transform:

A cosine transform is used as it is known to have a superior compaction property [1]. Further fast computation algorithms are available for computation of the DCT (Discrete Cosine Transform) [5]. The input image is divided into non-overlapping sub-blocks of 8×8 or 16×16 and subjected to a forward cosine transform. Different regions in the transform are coded with a different bit-rate depending on their subjective contribution to image quality.

The HVS Model and Image Quality Assessment:

The generic HVS model representation [2] used in this paper is as follows:

$$H(W)=(a+b)e^{-cW}$$

where a, b, c are constants determining the shape of the HVS curve. 'W' is the radial frequency in cycles per degree of visual angle subtended. This function is defined in the spatial domain. The cosine transform of the image causes a loss of physical significance to the human observer. To overcome this error, Nill [2] has proposed a function that modifies the original HVS response as, $$H'(W)=H(W)|A(W)|$$

This response is used to modulate the image in the transform domain. It is also used in defining a perceptual measure of error as PMSE (Perceptual Mean Square Error).

Representation:

The following is a representation of the encoder section of the codec.

Image Encoder Schema

Earlier work using fixed linguistic rules for quantization estimation suggests higher perceptual quality with improved compression ratio and peak signal to noise ratio as compared to the JPEG baseline system. The fuzzy estimator in this implementation encodes both the qualitative linguistic information provided by the human observer as well as quantitative data obtained from the Chen's classification system. This would help in adaptation to the instantaneous image parameters and would result in a higher compression ratio with a higher perceptual quality as would be indicated by the PMSE.

REFERENCES

[1] N. Ahmed, T. Natarajan and K. Rao. "Discrete Cosine Transform". IEEE Trans. Computer, Vol. C-23, pp 90–93, January 1994.
[2] N. B. Nill. "A Visual Model Weighted Cosine Transform for Image Compression and Quality Assessment". IEEE Trans. Commun., Vol. COM-33, pp. 551–557, 1985.
[3] Miroslaw Bedzak, Wienczyslaw Daca. "Intelligent Control by Fuzzy Neural Network Method". EUFIT '95, pp 1025–1030, August 1995.
[4] Wen-Hsiung Chen and Harrison Smith "Adaptive Coding of Monocrome and Color Images", IEEE Trans. Commun., Vol. COM-25, pp 1285–1292, Nov. 1977.
[5] W. Chen, C. H. Smith and Fralic, "A Fast Computational Algorithm for Discrete Cosine Transform", IEEE Trans. Commun., September 1997.

What is claimed is:

1. A method of correcting errors in a compressed motion picture signal having a plurality of frame pixel blocks in a current frame which include corrupt blocks and non-corrupt blocks, the method comprising:
    decoding non-corrupt blocks of the compressed motion picture signal;
    determining a % corruption of the current frame by counting a number of corrupt blocks and dividing the number of the corrupt blocks by a total number of blocks in the current frame; and
    for each main block in the current frame which is corrupt and an old main block in a previous frame immediately preceding the current frame and corresponding to the main block in the current frame, determining a percentage use representing a percentage of content in the old main block which has moved outside the main block in the current frame; and
    if the % corruption is smaller than a minimum corrupt threshold and if the percentage use is smaller than a minimum use threshold, then assigning zero motion vector to the main block in the current frame.

2. The method of claim 1 further comprising:
    if the % corruption is greater than a maximum allowable corrupt threshold, then avoiding determining and assigning new motion vectors for the corrupt blocks in the current frame.

3. The method of claim 1 further comprising:
    determining a motion vector and a rate of change of motion of each non-corrupt block in the current frame; and
    updating a shadow buffer with the motion vector and rate of change of motion for each non-corrupt block.

4. The method of claim 3 further comprising:
    for each main block in the current frame which is corrupt and an old main block in a previous frame immediately preceding the current frame and corresponding to the main block in the current frame, determining a motion vector and a rate of change of motion of the main block in the current frame; and
    updating the shadow buffer with the motion vector and rate of change of motion for the main block.

5. The method of claim 4 wherein determining a motion vector comprises:

if one or more of four adjacent blocks which are adjacent to the main block in the north, south, east, and west directions are non-corrupt in the current frame, and if the old main block in the previous frame corresponding to the main block in the current frame is non-corrupt, then reconstructing current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, averaging motion vectors of the one or more non-corrupt adjacent blocks in the current frame and the reconstructed current motion vector of the non-corrupt old main block, and assigning the averaged motion vector to the main block in the current frame;

if one or more of the four adjacent blocks are non-corrupt in the current frame, and if the old main block in the previous frame corresponding to the main block in the current frame is corrupt, then averaging motion vectors of the one or more non-corrupt adjacent blocks in the current frame, and assigning the averaged motion vector to the main block in the current frame;

if the four adjacent blocks are corrupt in the current frame and if one or more of four auxiliary blocks which are next to the main block in the northeast, northwest, southeast, and southwest directions are non-corrupt in the current frame, then averaging motion vectors of the one or more non-corrupt auxiliary blocks and assigning the averaged motion vector to the main block in the current frame; and if the four adjacent blocks and four auxiliary blocks are corrupt in the current frame and if the old main block in the previous frame is non-corrupt, then reconstructing current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, and assigning the motion vector of the old main block to the main block in the current frame.

6. The method of claim 5 further comprising:
if the four adjacent blocks and four auxiliary blocks are corrupt in the current frame and if the old main block in the previous frame is corrupt, and if one or more of four old adjacent blocks in the previous frame corresponding to the four adjacent blocks in the current frame are non-corrupt, then
  selecting the one or more non-corrupt old adjacent blocks which are non-corrupt;
  reconstructing current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$; and
  averaging the current motion vectors ($MV_{current}$) for the selected blocks and assigning the averaged motion vector to the main block in the current frame.

7. The method of claim 6 wherein determining a motion vector comprises:
if the four adjacent blocks and four auxiliary blocks are corrupt in the current frame and if the old main block in the previous frame is corrupt, and if the four old adjacent blocks in the previous frame are corrupt, then
  selecting the old main block and the four old adjacent blocks;
  reconstructing current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$; and
  averaging the current motion vectors ($MV_{current}$) for the selected blocks and assigning the averaged motion vector to the main block in the current frame.

8. The method of claim 1 further comprising:
reconstructing the motion picture based on the motion vectors and the rates of change of motion of the blocks in the present frame; and
post-processing the reconstructed motion picture by a weighted inverse human visual system.

9. The method of claim 8 wherein post-processing comprises:
providing a relationship of human visual response represented as a weighting versus frequency components, $H(w)$, based on the human visual system;
specifying a minimum threshold level of stimulation $C$;
calculating a weighted inverse human visual system parameter according to $InvH(w)=1/(H(w))+C$; and
applying the weighted inverse human visual system parameter to the corrupt blocks of the reconstructed motion picture.

10. A method of determining a motion vector for a main block of digital signal data having a plurality of frame pixel blocks in a current frame, wherein data relating to the main block are corrupt, the method comprising:
if one or more of four adjacent blocks which are adjacent to the main block in the north, south, east, and west directions are non-corrupt in the current frame, and if an old main block in a previous frame immediately preceding the current frame and corresponding to the main block in the current frame is non-corrupt, then reconstructing current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, averaging motion vectors of the one or more non-corrupt adjacent blocks in the current frame and the reconstructed current motion vector of the non-corrupt old main block, and assigning the averaged motion vector to the main block in the current frame.

11. The method of claim 10 further comprising:
if one or more of the four adjacent blocks are non-corrupt in the current frame, and if the old main block in the previous frame corresponding to the main block in the current frame is corrupt, then averaging motion vectors of the one or more non-corrupt adjacent blocks in the current frame, and assigning the averaged motion vector to the main block in the current frame; and
if the four adjacent blocks are corrupt in the current frame and if one or more of four auxiliary blocks which are next to the main block in the northeast, northwest, southeast, and southwest directions are non-corrupt in the current frame, then averaging motion vectors of the one or more non-corrupt auxiliary blocks and assigning the averaged motion vector to the main block in the current frame.

12. The method of claim 11 further comprising:
if the four adjacent blocks and four auxiliary blocks are corrupt in the current frame and if the old main block in the previous frame is non-corrupt, then reconstructing current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, and assigning the motion vector of the old main block to the main block in the current frame.

13. The method of claim 12 further comprising:
if the four adjacent blocks and four auxiliary blocks are corrupt in the current frame and if the old main block in the previous frame is corrupt, and if one or more of four old adjacent blocks in the previous frame corresponding to the four adjacent blocks in the current frame are non-corrupt, then
  selecting the one or more non-corrupt old adjacent blocks which are non-corrupt;
  reconstructing current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$; and
  averaging the current motion vectors ($MV_{current}$) for the selected blocks and assigning the averaged motion vector to the main block in the current frame.

14. The method of claim 13 further comprising:
if the four adjacent blocks and four auxiliary blocks are corrupt in the current frame and if the old main block in the previous frame is corrupt, and if the four old adjacent blocks in the previous frame are corrupt, then
  selecting the old main block and the four old adjacent blocks;
  reconstructing current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$; and
  averaging the current motion vectors ($MV_{current}$) for the selected blocks and assigning the averaged motion vector to the main block in the current frame.

15. The method of claim 10 further comprising:
determining a % corruption of the current frame by counting a number of corrupt blocks and dividing the number of the corrupt blocks by a total number of blocks in the current frame; and
if the % corruption is greater than a maximum allowable corrupt threshold, then avoiding determining and assigning new motion vectors for the corrupt blocks in the current frame.

16. The method of claim 10 further comprising:
determining a % corruption of the current frame by counting a number of corrupt blocks and dividing the number of the corrupt blocks by a total number of blocks in the current frame;
determining a percentage use of the main block representing a percentage of content in the old main block which has moved outside the main block in the current frame; and
if the % corruption is smaller than a minimum corrupt threshold and if the percentage use is smaller than a minimum use threshold, then assigning zero motion vector to the main block in the current frame.

17. The method of claim 10 wherein the motion vectors and previous rate of change of motion of the old blocks in the previous frame are obtained by accessing a shadow buffer.

18. The method of claim 10 further comprising updating a shadow buffer after determining the motion vector and rate of change of motion of the main block in the current frame.

19. A method of determining a motion vector for a main block of digital signal data having a plurality of frame pixel blocks in a current frame, wherein data relating to the main block are corrupt, four adjacent blocks being adjacent to the main block in the north, south, east, and west directions, four auxiliary blocks being next to the main block in the northeast, northwest, southeast, and southwest directions, an old main block in a previous frame immediately preceding the current frame corresponding to the main block in the current frame, four old adjacent blocks in the previous frame corresponding to the four adjacent blocks in the current frame, the method comprising:
if the four adjacent blocks and four auxiliary blocks are corrupt in the current frame and if the old main block in the previous frame is corrupt, and if the four old adjacent blocks in the previous frame are corrupt, then
  selecting the old main block and the four old adjacent blocks;
  reconstructing current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$; and
  averaging the current motion vectors ($MV_{current}$) for the selected blocks and assigning the averaged motion vector to the main block in the current frame.

20. The method of claim 19 further comprising:
if one or more of the four adjacent blocks are non-corrupt in the current frame, and if the old main block in the previous frame is non-corrupt, then reconstructing current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, averaging motion vectors of the one or more non-corrupt adjacent blocks in the current frame and the reconstructed current motion vector of the non-corrupt old main block, and assigning the averaged motion vector to the main block in the current frame;
if one or more of the four adjacent blocks are non-corrupt in the current frame, and if the old main block in the previous frame is corrupt, then averaging motion vectors of the one or more non-corrupt adjacent blocks in the current frame, and assigning the averaged motion vector to the main block in the current frame; and
if the four adjacent blocks are corrupt in the current frame and if one or more of four auxiliary blocks are non-corrupt in the current frame, then averaging motion vectors of the one or more non-corrupt auxiliary blocks and assigning the averaged motion vector to the main block in the current frame.

21. The method of claim 19 further comprising:
if the four adjacent blocks and four auxiliary blocks are corrupt in the current frame and if the old main block in the previous frame is non-corrupt, then reconstructing current motion vector ($MV_{current}$) for the old main block by updating the motion vector ($MV_{old}$) of the old main block using a previous rate of change of motion of the old main block $(dx, dy)_{old}$ and using $MV_{current}=MV_{old}+(dx, dy)_{old}$, and assigning the motion vector of the old main block to the main block in the current frame; and
if the four adjacent blocks and four auxiliary blocks are corrupt in the current frame and if the old main block in the previous frame is corrupt, and if one or more of four old adjacent blocks in the previous frame are non-corrupt, then
  selecting the one or more non-corrupt old adjacent blocks which are non-corrupt;

reconstructing current motion vectors ($MV_{current}$) for each selected block by updating the motion vectors ($MV_{old}$) of the old blocks using a previous rate of change of motion of the old block $(dx, dy)_{old}$, and using $MV_{current}=MV_{old}+(dx, dy)_{old}$; and averaging the current motion vectors ($MV_{current}$) for the selected blocks and assigning the averaged motion vector to the main block in the current frame.

22. A method of correcting errors in a compressed motion picture signal having a plurality of frame pixel blocks in a current frame which include corrupt blocks and non-corrupt blocks, the method comprising:

decoding non-corrupt blocks of the compressed motion picture signal in the current frame;

decoding corrupt blocks of the compressed motion picture signal using information of the non-corrupt blocks in the current frame and information of old blocks in a previous frame immediately preceding the current frame;

reconstructing the motion picture based on motion vectors and rates of change of motion of the blocks in the present frame; and post-processing the reconstructed motion picture by a weighted inverse human visual system.

23. The method of claim 22 wherein post-processing comprises:

providing a relationship of human visual response represented as a weighting versus frequency components, H(w), based on the human visual system;

specifying a minimum threshold level of stimulation C;

calculating a weighted inverse human visual system parameter according to 1/(H(w))+C; and applying the weighted inverse human visual system parameter to the corrupt blocks of the reconstructed motion picture.

24. A system for correcting errors in a compressed motion picture signal having a plurality of frame pixel blocks in a current frame which include corrupt blocks and non-corrupt blocks, the system comprising:

a decoding unit configured to decode non-corrupt blocks of the compressed motion picture signal; and an error concealment unit configured to determine, for each main block in the current frame which is corrupt and an old main block in a previous frame immediately preceding the current frame and corresponding to the main block in the current frame, a motion vector of the main block in the current frame, wherein determining the motion vector of the main block includes:

decoding non-corrupt blocks of the compressed motion picture signal;

determining a % corruption of the current frame by counting a number of corrupt blocks and dividing the number of the corrupt blocks by a total number of blocks in the current frame;

for each main block in the current frame which is corrupt and an old main block in a previous frame immediately preceding the current frame and corresponding to the main block in the current frame, determining a percentage use representing a percentage of content in the old main block which has moved outside the main block in the current frame; and if the % corruption is smaller than a minimum corrupt threshold and if the percentage use is smaller than a minimum use threshold, then assigning zero motion vector to the main block in the current frame.

25. The system of claim 24 wherein the error concealment unit is configured to determine the motion vector of the main block by:

if the % corruption is greater than a maximum allowable corrupt threshold, then avoiding determining and assigning new motion vectors for the corrupt blocks in the current frame.

26. The system of claim 24 wherein the error concealment unit is configured to determine the motion vector of the main block by:

determining a motion vector and a rate of change of motion of each non-corrupt block in the current frame;

updating a shadow buffer with the motion vector and rate of change of motion for each non-corrupt block;

for each main block in the current frame which is corrupt and an old main block in a previous frame immediately preceding the current frame and corresponding to the main block in the current frame, determining a motion vector and a rate of change of motion of the main block in the current frame; and updating the shadow buffer with the motion vector and rate of change of motion for the main block.

27. The system of claim 24 further comprising:

a shadow buffer configured to store decoded motion vectors of the blocks of the compressed motion picture signal; and a shadow buffer access unit configured to access the shadow buffer to retrieve data and update data in the shadow buffer.

28. The system of claim 24 further comprising:

a motion compensation unit configured to reconstruct the motion picture based on the motion vectors of the blocks in the present frame; and a post-processing unit configured to post-process the reconstructed motion picture by a weighted inverse human visual system.

29. The system of claim 28 wherein the post-processing unit is configured to post-process the reconstructed motion picture by:

providing a relationship of human visual response represented as a weighting versus frequency components, H(w), based on the human visual system;

specifying a minimum threshold level of stimulation C;

calculating a weighted inverse human visual system parameter according to 1/(H(w))+C; and applying the weighted inverse human visual system parameter to the corrupt blocks of the reconstructed motion picture.

* * * * *